United States Patent
Akiyama et al.

(10) Patent No.: US 8,970,858 B2
(45) Date of Patent: Mar. 3, 2015

(54) OPERATOR GUIDANCE SYSTEM AND IMAGE FORMING APPARATUS INCORPORATING SAME

(71) Applicants: Mami Akiyama, Kanagawa (JP); Yasuhiro Sagawa, Kanagawa (JP); Masaharu Furuya, Kanagawa (JP); Manabu Izumikawa, Tokyo (JP); Mikio Ishibashi, Kanagawa (JP); Yoshio Hattori, Kanagawa (JP); So Ohta, Tokyo (JP); Ryo Takenaka, Tokyo (JP); Hiroaki Murakami, Kanagawa (JP)

(72) Inventors: Mami Akiyama, Kanagawa (JP); Yasuhiro Sagawa, Kanagawa (JP); Masaharu Furuya, Kanagawa (JP); Manabu Izumikawa, Tokyo (JP); Mikio Ishibashi, Kanagawa (JP); Yoshio Hattori, Kanagawa (JP); So Ohta, Tokyo (JP); Ryo Takenaka, Tokyo (JP); Hiroaki Murakami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 168 days.

(21) Appl. No.: 13/678,671

(22) Filed: Nov. 16, 2012

(65) Prior Publication Data
US 2013/0135646 A1 May 30, 2013

(30) Foreign Application Priority Data
Nov. 30, 2011 (JP) .................................. 2011-261987

(51) Int. Cl.
*G06F 3/12* (2006.01)
*G03G 15/00* (2006.01)

(52) U.S. Cl.
CPC ................ *G06F 3/12* (2013.01); *G03G 15/502* (2013.01); *G03G 15/70* (2013.01)
USPC ........................................................ 358/1.13

(58) Field of Classification Search
None
See application file for complete search history.

(56) References Cited

U.S. PATENT DOCUMENTS 5,124,759 A * 6/1992 Fukuchi et al. ................. 399/22

FOREIGN PATENT DOCUMENTS

| JP | 8-069223 | 3/1996 |
| JP | 10-107940 | 4/1998 |
| JP | 2000-079745 | 3/2000 |
| JP | 2000-085220 | 3/2000 |
| JP | 2000-089619 | 3/2000 |
| JP | 2000-122361 | 4/2000 |
| JP | 2000-155508 | 6/2000 |

OTHER PUBLICATIONS

Machine translation of JP 2000-089619 date Mar. 2000.*

* cited by examiner

*Primary Examiner* — Saeid Ebrahimi Dehkordy
*Assistant Examiner* — Lennin Rodriguezgonzale
(74) *Attorney, Agent, or Firm* — Harness, Dickey & Pierce, P.L.C.

(57) ABSTRACT

An operator guidance system includes a detection unit, a control unit, and an operation indicator. The detection unit is disposed in an image forming apparatus to output a combination of detection signals, and includes one or more media sensors, and one or more opening sensors. The one or more media sensors are disposed along a media conveyance path to output a media detection signal. The one or more opening sensors are disposed adjacent to an openable structure to output an opening detection signal. The control unit is connected to the detection unit to determine guidance to be provided to an operator based on the combination of detection signals, and includes a memory and a controller. The operation indicator is connected to the control unit to indicate the identified operation to the operator.

17 Claims, 8 Drawing Sheets

OPERATOR GUIDANCE SYSTEM AND IMAGE FORMING APPARATUS INCORPORATING SAME

CROSS-REFERENCE TO RELATED APPLICATION

The present patent application claims priority pursuant to 35 U.S.C. §119 from Japanese Patent Application No. 2011-261987, filed on Nov. 30, 2011, which is hereby incorporated by reference herein in its entirety.

BACKGROUND OF THE INVENTION

1. Technical Field

The present invention relates to an operator guidance system and an image forming apparatus incorporating the same, and more particularly, to an operator guidance system that provides guidance to a human operator, and an image forming apparatus incorporating such an operator guidance capability.

2. Background Art

An operator guidance system is employed in various types of modern electronic equipment to provide guidance to a human operator. For example, some image forming apparatuses, such as printers and photocopiers, incorporate an operator guidance system that provides instructions and support to an operator, for example, upon occurrence of a malfunction, such as a paper jam, where the operator is required to clear a jammed sheet of paper by manipulating doors, lids, plates, and other types of openable structure to access an internal, paper conveyance path of the apparatus.

Various methods have been proposed to provide an effective operator guidance system for use in an image forming apparatus.

For example, one conventional method provides a graphic display system for an image forming apparatus, which displays graphics information on a control panel of the apparatus. The display information includes a series of graphic screens, each illustrating a specific manual operation required to remove a paper jam from the image forming apparatus. Upon completion of every single operation presented on the control panel, the user is required to press a "next" button appearing on the display screen, which permits the control panel to switch from one screen to another illustrating a subsequent operation to be performed by the operator.

Another conventional method provides a user guidance system for an image forming apparatus, including a jam detector for detecting a paper jam at a plurality of locations in the apparatus, a memory for generating animated illustration of a procedure for removal of the paper jam, and a display device for displaying animation on a control panel of the apparatus. The display device includes an automatic switching capability that allows the control panel to present a plurality of automatically switching, successive screens illustrating an entire procedure for removing jammed paper once the operator pushes an "auto-transition" button appearing on the display screen.

Although effective for their intended purposes, the above-described methods have several drawbacks.

For example, in the non-automatic display system, switching the display screen requires the operator to perform an extra action (i.e., pressing the button) on the control panel, which can be confusing or annoying to the operator performing complicated manual operations on the equipment. Particularly where the operator, having executed several successive operations without viewing the display screen, seeks to know a subsequently required operation from the control panel, he or she is required to hit the "next" button several times to reach the corresponding display screen. Necessitating such extra button presses makes it inconvenient or difficult for the operator to follow the guidance information on the display screen, resulting in an increased time and effort to service the image forming apparatus.

Moreover, in both systems, determining whether all the paper jams have been properly cleared requires the operator to execute a predetermined manual operation, such as closing an access door, for triggering the display device to inform the operator of completion or incompletion of the paper jam removal. Such triggering action, which is sometimes unnecessary for removal of the paper jam itself, can make the procedure more troublesome than should be the case. In addition, lacking timely completion information on the control panel can cause the operator to believe falsely that some problem remains unfixed after removal of the paper jam, or feel awkward upon knowing incomplete removal of the paper jam only after closure of the access door.

SUMMARY OF THE INVENTION

Exemplary aspects of the present invention are put forward in view of the above-described circumstances, and provide a novel operator guidance system to provide guidance to a human operator using an image forming apparatus that includes a media conveyance path along which a recording medium is conveyed, and an openable structure manually operable by the operator to allow access to the media conveyance path when opened.

In one exemplary embodiment, the operator guidance system includes a detection unit, a control unit, and an operation indicator. The detection unit is disposed in the image forming apparatus to output a combination of detection signals, and includes one or more media sensors, and one or more opening sensors. The one or more media sensors are disposed along the media conveyance path to output a media detection signal indicating presence or absence of the recording medium in the media conveyance path. The one or more opening sensors are disposed adjacent to the openable structure to output an opening detection signal indicating opening or closing of the openable structure. The control unit is connected to the detection unit to determine guidance to be provided to the operator based on the combination of detection signals, and includes a memory and a controller. The memory stores a reference table that associates combinations of detection signals with manual operations that the operator performs on the apparatus. The controller identifies a particular manual operation associated with the combination of detection signals output from the detection unit in the reference table. The operation indicator is connected to the control unit to indicate the identified operation to the operator.

Other exemplary aspects of the present invention are put forward in view of the above-described circumstances, and provide a novel operator guidance method.

Still other exemplary aspects of the present invention are put forward in view of the above-described circumstances, and provide a novel image forming apparatus.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
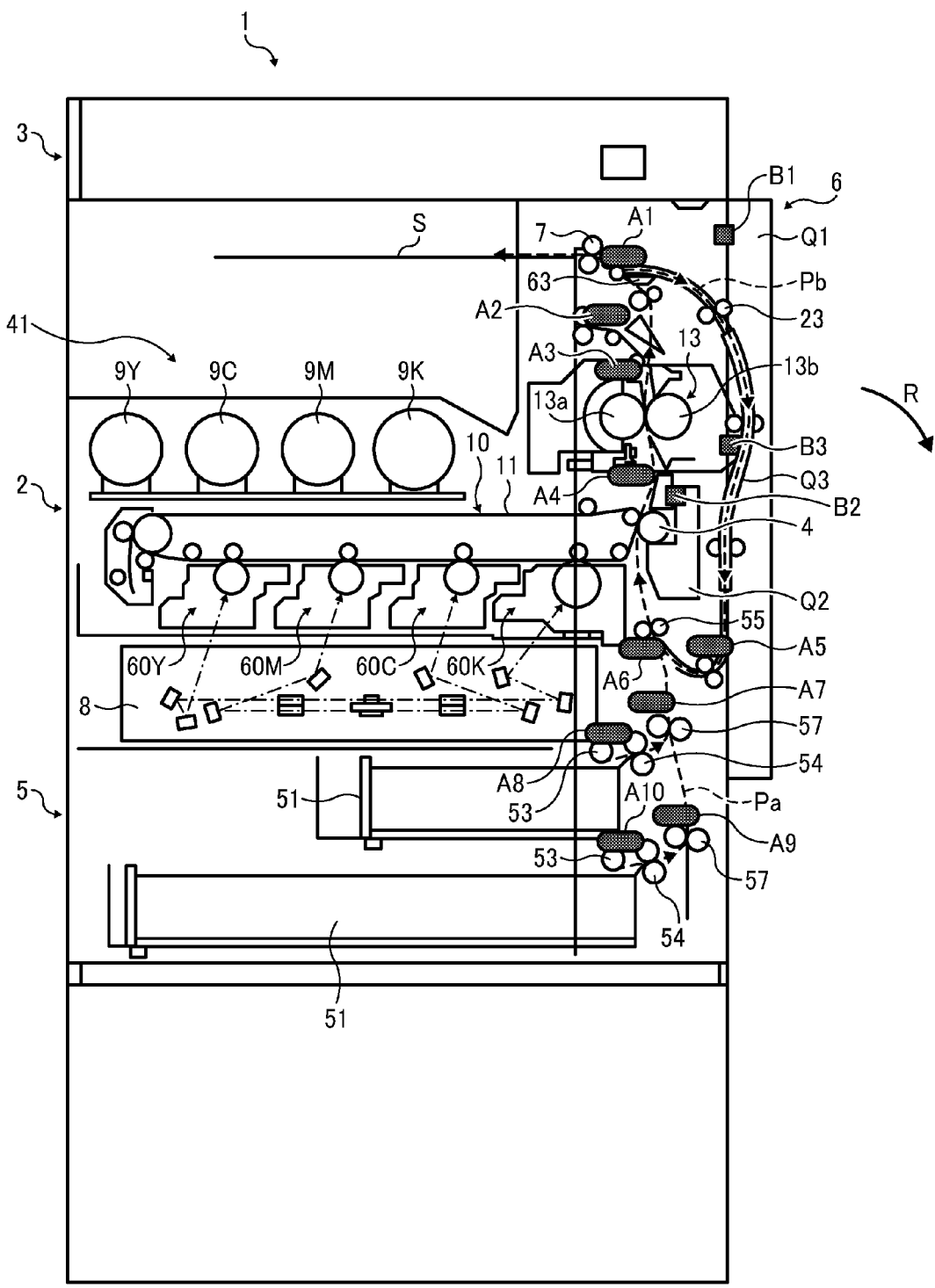
FIG. 1 schematically illustrates an image forming apparatus incorporating an operator guidance system according to one embodiment of this patent specification.

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, exemplary embodiments of the present patent application are described.

FIG. 1 schematically illustrates an image forming apparatus 1 incorporating an operator guidance system 100 according to one embodiment of this patent specification.

As shown in FIG. 1, the image forming apparatus 1 comprises a tandem color printer that can print a color image on a recording medium S, such as a sheet of paper, consisting of a main, printing unit 2, an image scanning unit 3 disposed atop the apparatus 1 for capturing images from an original document, and a sheet feeding unit 5 disposed at the bottom of the apparatus 1 for feeding recording sheet S into the printing unit 2. Optionally, the image forming apparatus 1 includes a duplex unit 6 disposed on one side of the apparatus body to provide a duplex printing capability for creating images on both sides of a single recording sheet S.

In the image forming apparatus 1, the printing unit 2 includes four imaging stations 60Y, 60M, 60C, and 60K, each including a photoconductor surrounded by various pieces of imaging equipment for creating an image on the photoconductive surface with toner particles of a particular primary color, as indicated by suffix letters "Y" for yellow, "M" for magenta, "C" for cyan, and "K" for black. An exposure device 8 is disposed below the imaging stations 60 from which a light beam is directed to the photoconductor to create an electrostatic latent image on the photoconductive surface. Four toner bottles 9Y, 9M, 9C, and 9K are provided, each containing toner for supply to the imaging stations 60Y, 60M, 60C, and 60K, respectively.

Immediately above the imaging stations 60 is an image transfer unit 10, including an endless, intermediate transfer belt 11 defining an image bearing surface to carry the toner image thereon. Four primary transfer rollers are disposed each facing the photoconductor of an associated one of the imaging stations 60 via the belt 11 to form a primary transfer nip therebetween, at which the toner image is transferred from the photoconductive surface to the image bearing surface of the belt 11. A secondary transfer device 4 is disposed adjacent to the intermediate transfer belt 11 to form a secondary transfer nip therebetween, at which the toner image is transferred from the image bearing surface to the recording sheet S.

Disposed above the secondary transfer device 4 is a fixing device 13 including a pair of fixing rollers 13a and 13b disposed opposite each other to form a fixing nip therebetween, through which the recording sheet S is passed to fix the toner image in place with heat and pressure.

The sheet feeding unit 5 includes one or more input sheet trays 51 each accommodating a stack of recording sheets S. An in-body, output sheet tray 41 is disposed in an upper portion of the apparatus body to define an open space into which the recording sheet S after printing is output for stacking outside the apparatus body.

Multiple conveyance rollers and guide mechanism are provided to convey the recording sheet S upward from the input sheet tray 51 to the output sheet tray 41 and when needed, downward through the duplex unit 6 during duplex printing.

For example, a feed roller 53, a first pair of conveyance rollers 54, and a second pair of conveyance rollers 57 are disposed adjacent to each input sheet tray 51 to supply the recording sheet S from the sheet stack. A pair of registration rollers 55 is provided adjacent to the secondary transfer device 4 to hold the recording sheet S fed from the input sheet tray 51 for subsequent supply to the secondary transfer nip in coordination with the intermediate transfer belt 11.

A pair of bidirectional output rollers 7 is disposed above the fixing device 13, which directs the recording sheet S to the output sheet tray 41 when driven to a forward direction, and to the duplex unit 6 when driven to a backward direction. A sheet diverter 63 is disposed adjacent to the output roller pair 7 to guide the recording sheet S to the duplex unit 6. One or more pairs of duplex conveyance rollers 23 are provided to advance the recording sheet S toward the registration roller pair 55 through the duplex unit 6.

The output rollers 7 and the sheet diverter 63 together form a switchback mechanism, in which the recording sheet S partially exiting the apparatus body is directed backward into the duplex unit 6 to be turned upside down, as it passes through the duplex unit 6 to reenter between the registration roller pair 55.

General construction and operation of the image forming apparatus are well known in the art, and thus will not be described in detail herein.

With continued reference to FIG. 1, the image forming apparatus 1 is shown including a sheet conveyance path P along which the recording sheet S is conveyed and an openable structure Q manually operable by the operator to allow access to the sheet conveyance path P when opened.

Specifically, in the present embodiment, the sheet conveyance path P includes a main, simplex path Pa along which the recording sheet S travels from the input sheet tray 51 upward to the output sheet tray 41 while passing through the secondary transfer nip and the fixing nip, and a duplex path Pb along which the recording sheet S travels from the output roller pair 7 downward toward the registration roller pair 55 without passing through the fixing nip and the secondary transfer nip.

The simplex path Pa is defined by multiple rollers and guide plates, including, for example, the feed rollers 53, the conveyance rollers 54 and 57, and the registration roller pair 55, as well as those in the secondary transfer device 4 and the fixing device 13. The duplex path Pb is defined by multiple rollers and guide plates, including, for example, the sheet diverter 63 and the conveyance roller pair 23.

The openable structure Q comprises any type of manually operable equipment, such as a door, cover, lid, or plate, which can be opened and closed by a human operator through a suitable manual operation. For example, in the present embodiment, the openable structure Q includes a duplex door Q1, a transfer guide plate Q2, and a duplex guide plate Q3.

The duplex door Q1 is disposed on one side of the apparatus body to cover an internal structure of the image forming apparatus 1. The door Q1 has its bottom end hinged to the apparatus body to define a rotational axis about which the door Q1, when opened, rotates in an outward direction indicated by an arrow R in FIG. 1.

The transfer guide plate Q2 is disposed adjacent to the secondary transfer device 4 inside the apparatus body to cover the simplex path Pa extending from the registration roller pair 55 toward the secondary transfer nip, while allowing proper conveyance of the recording sheet S therethrough for efficient secondary image transfer. The plate Q2 is accessible for manual operation after the duplex door Q1 is opened.

The duplex guide plate Q3 is disposed in the duplex unit 6 inside the apparatus body to cover the duplex path Pb extending from the conveyance roller pair 23, while allowing proper conveyance of the recording sheet S therethrough. The plate Q3 is accessible for manual operation after the duplex door Q1 is opened.

According to this patent specification, the image forming apparatus 1 incorporates an operator guidance system 100 that provides guidance a human operator, for example, upon occurrence of a malfunction, such as a paper misfeed or jamming, in the sheet conveyance path P, such that the operator can access the sheet conveyance path P by properly manipulating the openable structure Q in the image forming apparatus 1.

Figure 2:
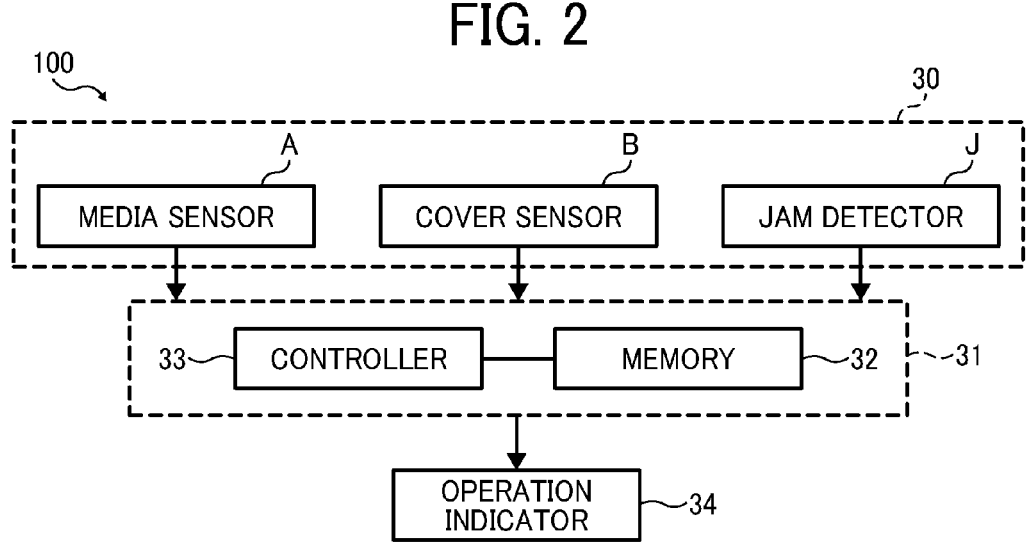
FIG. 2 is a block diagram illustrating the operator guidance system according to one or more embodiments of this patent specification.

With additional reference to FIG. 2, the operator guidance system 100 according to one or more embodiments of this patent specification is shown, including a detection unit 30 disposed in the image forming apparatus to output a combination of detection signals, and a control unit 31 connected to the detection unit 30 to determine guidance to be provided to the operator based on the combination of detection signals.

The detection unit 30 includes one or more sheet sensors A disposed along the sheet conveyance path P to output a sheet detection signal indicating presence or absence of the recording sheet S in the sheet conveyance path P, and one or more opening sensors B disposed adjacent to the manually openable structure Q to output an opening detection signal indicating opening or closing of the openable structure Q.

The control unit 31 includes a memory 32 storing a reference table that associates combinations of detection signals with manual operations that the operator performs on the apparatus 1, and a controller 33 to identify a particular manual operation associated with the combination of detection signals output from the detection unit 30 in the reference table.

Also included in the operator guidance system 100 is an operation indicator 34 connected to the control unit 31 to indicate the identified operation to the operator.

Specifically, in the present embodiment, the one or more sheet sensors A include a plurality of sheet sensing elements A1 through Am, with "m" representing any suitable number depending on specific application, of which ten are visible in FIG. 1. Each sheet sensor A is disposed at a specific location along the sheet conveyance path P to detect whether the recording sheet S is present or absent at that particular location, and accordingly generates a sheet detection signal for output to the control unit 31.

The one or more opening sensors B include a plurality of opening sensing elements B1 through Bn, with "n" representing any suitable number depending on specific application, of which three are visible in FIG. 1. Each opening sensor B is disposed adjacent to a specific openable structure Q to detect whether that particular structure Q is opened or closed, and accordingly generates an opening detection signal for output to the control unit 31.

More specifically, the first opening sensor B1 is disposed at a free end (that is, opposite the hinged, bottom end) of the duplex door Q1 to monitor the status of the door Q1. The second opening sensor B2 is disposed adjacent to the secondary transfer guide plate Q2 to monitor the status of the plate Q2. The third opening sensor B3 is disposed adjacent to the duplex guide plate Q3 to monitor the status of the plate Q3.

Optionally, in addition to the sheet and opening sensors A and B, the detection unit 30 may also include a jam detector J to output a jam detection signal indicating presence or absence of a jammed recording medium in the sheet conveyance path P. Provision of the jam detector J allows for positioning a jammed recording sheet S, even where the sheet jam fails to be detected by the sheet sensor A, for example, due to a limited coverage of the sensing elements.

The jam detector J includes a plurality of outputs J1 through Jl, with "l" representing any suitable number depending on specific application. Each detector output is associated with a specific location along the sheet conveyance path P to detect whether the recording sheet S is jammed at that particular location, and accordingly outputs a jam detection signal to the control unit 31.

Any suitable sensor or detector may be used in the detection unit 31 of the operator guidance system 100. For example, the opening sensor B may be configured as a mechanical switch connected with the door to turn on and off upon movement of the door, or an optical transmissive sensor with its light emitter and detector elements on opposite sides of the door to turn on or off as the door moves to intercept light transmission from the emitter to the detector. The jam detector J may be configured as arithmetic circuitry connected with the sheet sensors and conveyance control circuitry to calculate positions of the leading and trailing edges of the recording sheet S in the sheet conveyance path P based on the size of the recording sheet S input from the conveyance control circuitry and readings of one or more sheet sensors A.

The control unit 31 may be configured as a central processing unit (CPU) and its associated memory devices for storage and execution of a computer program by the CPU.

In the present embodiment, the memory 32 includes a lookup or reference table that contains different combinations of detection signal values output from the sheet sensor A, the opening sensor B, and the jam detector J, each signal combination assigned a unique status identifier (ID) number representing a specific operational status associated with a specific manual operation which is required to be performed on the image forming apparatus 1 in such an operational status.

Upon receiving a combination of detection signals from the sheet sensors A, the opening sensors B, and the jam detectors J, the controller 33 accesses the memory 32 to compare the received combination of detection signal values with those contained in the reference table to retrieve a specific status ID number and its associated operation for transmission to the operation indicator 34.

More specifically, the controller 33 identifies one or more manual operations to be performed consecutively upon occurrence of a malfunction, each operation numbered with a unique identifier number. In such case, the operation indicator 34 indicates initially a lower-numbered operation and subsequently a higher-numbered operation after the operator performs the lower-numbered operation.

Further, the controller 33 identifies one or more series of operations to be performed consecutively upon occurrence of a malfunction, each operation numbered with a unique identifier number. In such cases, the operation indicator 34 indicates initially a lower-numbered series of operations and subsequently a higher-numbered series of operations after the operator performs the lower-numbered series of operations.

Table 1 below is an exemplary excerpt from the reference table included in the memory 32.

TABLE 1

| | Opening sensor | | | | | Sheet sensor | | | | | | | | Jam detector | | | | |
|---|---|---|---|---|---|---|---|---|---|---|---|---|---|---|---|---|---|---|
| ID | B1 | B2 | B3 | ... | Bn | A1 | ... | A5 | A6 | A7 | A8 | ... | Am | J1 | J2 | ... | Jl | Manual operation |
| 0 | 0 | 0 | 0 | ... | 0 | 0 | ... | 0 | 0 | 0 | 0 | ... | 0 | 0 | 0 | ... | 0 | (Default) |
| 1 | | | | | | | | | | | | | | | | | | X1 |
| 2 | | | | | | | | | | | | | | | | | | X2 |
| ... | | | | | | | | | | | | | | | | | | ... |
| k + 1 | 0 | 0 | — | | — | — | | — | 1 | — | — | | — | 1 | — | | — | Xk + 1: Open the duplex door |
| k + 2 | 1 | 0 | — | | — | — | | — | 1 | — | — | | — | 1 | — | | — | Xk + 2: Open the secondary transfer guide plate |
| k + 3 | 1 | 1 | — | | — | — | | — | 1 | — | — | | — | 1 | — | | — | Xk + 3: Remove the recording sheet |
| k + 4 | 1 | 1 | — | | — | — | | — | 0 | — | — | | — | 1 | — | | — | Xk + 4: Close the secondary transfer guide plate |
| k + 5 | 1 | 0 | — | | — | — | | — | 0 | — | — | | — | 1 | — | | — | Xk + 5: Close the secondary transfer guide plate |
| k + 6 | 1 | 0 | — | | — | — | | — | 0 | — | — | | — | 0 | — | | — | Xk + 6: Continue to the next step |
| k + 7 | 0 | — | 0 | | — | — | | 1 | — | — | — | | — | — | 1 | | — | Xk + 7: Open the duplex door |
| k + 8 | 1 | — | 0 | | — | — | | 1 | — | — | — | | — | — | 1 | | — | Xk + 8: Open the duplex guide plate |
| k + 9 | 1 | — | 1 | | — | — | | 1 | — | — | — | | — | — | 1 | | — | Xk + 9: Remove the recording sheet |
| k + 10 | 1 | — | 1 | | — | — | | 0 | — | — | — | | — | — | 1 | | — | Xk + 10: Close the duplex guide plate |
| k + 11 | 1 | — | 0 | | — | — | | 0 | — | — | — | | — | — | 1 | | — | Xk + 11: Close the duplex guide plate |
| k + 12 | 1 | — | 0 | | — | — | | 0 | — | — | — | | — | — | 0 | | — | Xk + 12: Continue to the next step |
| k + 13 | 0 | — | 0 | | — | — | | (0) | — | — | — | | — | — | 1 | | — | Xk + 13: Open the duplex door |
| k + 14 | 1 | — | 0 | | — | — | | (0) | — | — | — | | — | — | 1 | | — | Xk + 14: Open the duplex guide plate and remove the recording sheet |
| k + 15 | 1 | — | 1 | | — | — | | (0) | — | — | — | | — | — | 1 | | — | Xk + 15: Remove the recording sheet and close the duplex guide plate |
| k + 16 | 1 | — | 0 | | — | — | | (0) | — | — | — | | — | — | 1 | | — | Xk + 16: Remove the recording sheet and close the duplex guide plate |
| k + 17 | 1 | — | 0 | | — | — | | (0) | — | — | — | | — | — | 0 | | — | Xk + 17: Continue to the next step |
| ... | | | | | | | | | | | | | | | | | | ... |
| p − 1 | | | | | | | | | | | | | | | | | | Xp − 1 |
| p | | | | | | | | | | | | | | | | | | Xp |
| END | 0 | 0 | 0 | ... | 0 | 0 | ... | 0 | 0 | 0 | 0 | ... | 0 | 0 | 0 | ... | 0 | (Default) |

In the reference table above, values "1" and "0" in the sheet sensor fields A1 through Am indicate presence and absence, respectively, of the recording sheet S in the sheet conveyance path P; values "1" and "0" in the opening sensor fields B1 through Bn indicate opening and closure, respectively, of the openable structure Q; values "1" and "0" in the jam detector fields J1 through Jl indicate presence and absence, respectively, of a jammed recording sheet S in the sheet conveyance path P; and a dash "-" in each entry field indicates the item is masked or excluded from reference by the controller 33.

As shown in Table 1, the reference table contains multiple combinations of detection signal values identified by ID numbers ranging from zero to p, with "p" representing any suitable number depending on specific application, each representing a specific operational status associated with a specific manual operation X. The combinations of detection signal values are arranged into one or more groups identified by different ranges of ID numbers, such as, for example, k+1 through k+6, k+7 through k+12, and k+13 through k+17, respectively, each associated with a series of operations Xk+1 through Xk+6 to be performed consecutively upon occurrence of a malfunction.

Specifically, the group of combinations identified by the number range k+1 through k+6 is associated with a series of operations Xk+1 through Xk+6 to be performed consecutively where the sheet sensor A6 detects a paper jam around the secondary transfer device 4. The group of combinations identified by the number range k+7 through k+12 is associated with a series of operations Xk+7 through Xk+12 to be performed consecutively where the sheet sensor A5 detects a paper jam around the duplex unit 6. The group of combinations identified by the number range k+13 through k+17 is associated with a series of operations Xk+13 through Xk+17 to be performed consecutively where the jam detector J2 detects a paper jam around the duplex unit 6.

Note that there is a difference between the grouped series of signal combinations identified by the number ranges k+7 through k+12 and k+13 through k+17, both of which are directed to a paper jam occurring at the identical location. That is, in the former, completion of removal of the paper jam is determined upon a change in the output of the sheet sensor A5, whereas in the latter, completion of removal of the paper jam is determined upon a change in the output of the jam detector J2 triggered by opening and closure of the duplex door Q1.

In the present embodiment, the operation indicator 34 comprises a user interface or other electronic equipment that presents information in a suitable, human-perceptible form selected from the group consisting of sound, text, graphic, animation, video, and combination thereof. For example, the operation indicator 34 includes a display device that visually indicates the identified operation. Alternatively, instead, the operation indicator 34 includes an audio device that audibly indicates the identified operation. Such visual and/or audible indication may be implemented using a control panel provided, for example, at an upper position adjacent to the image scanner 2 of the image forming apparatus 1, which displays text message in combination with graphic images to communicate information relating to the printer and peripheral components.

Figure 3:
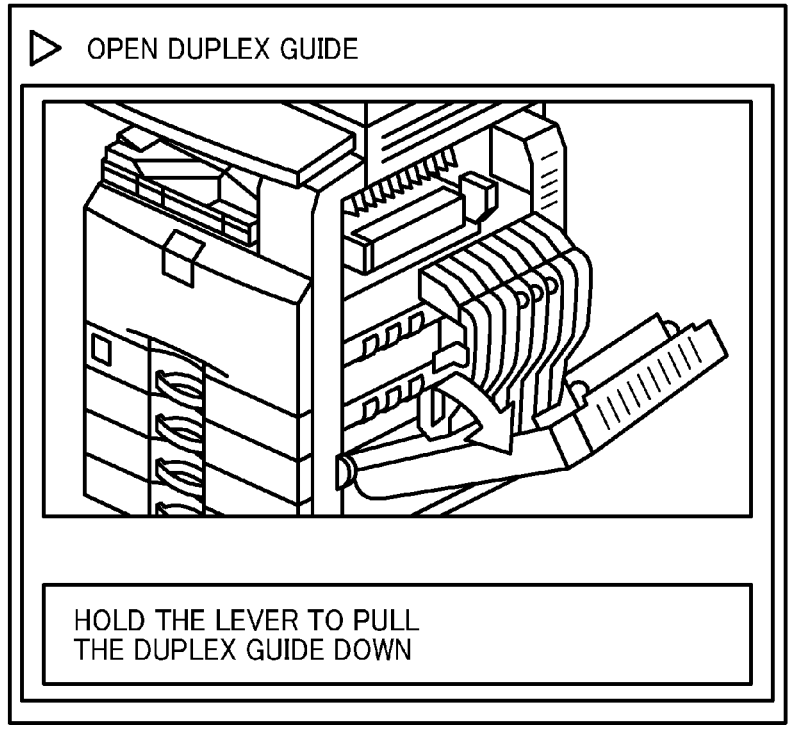
FIG. 3 is a schematic view of an exemplary screen displayed by an operation indicator included in the operator guidance system.

An exemplary screen displayed by the operation indictor 34 is shown in FIG. 3, which illustrates a prompt on the control panel requesting the operator to open the duplex guide plate Q3. Providing the information in an animation or moving image may facilitate recognition of the operator prompt. Moreover, the control panel may use a sound or voice message either alone or in combination with the animated display screen.

Figure 4:
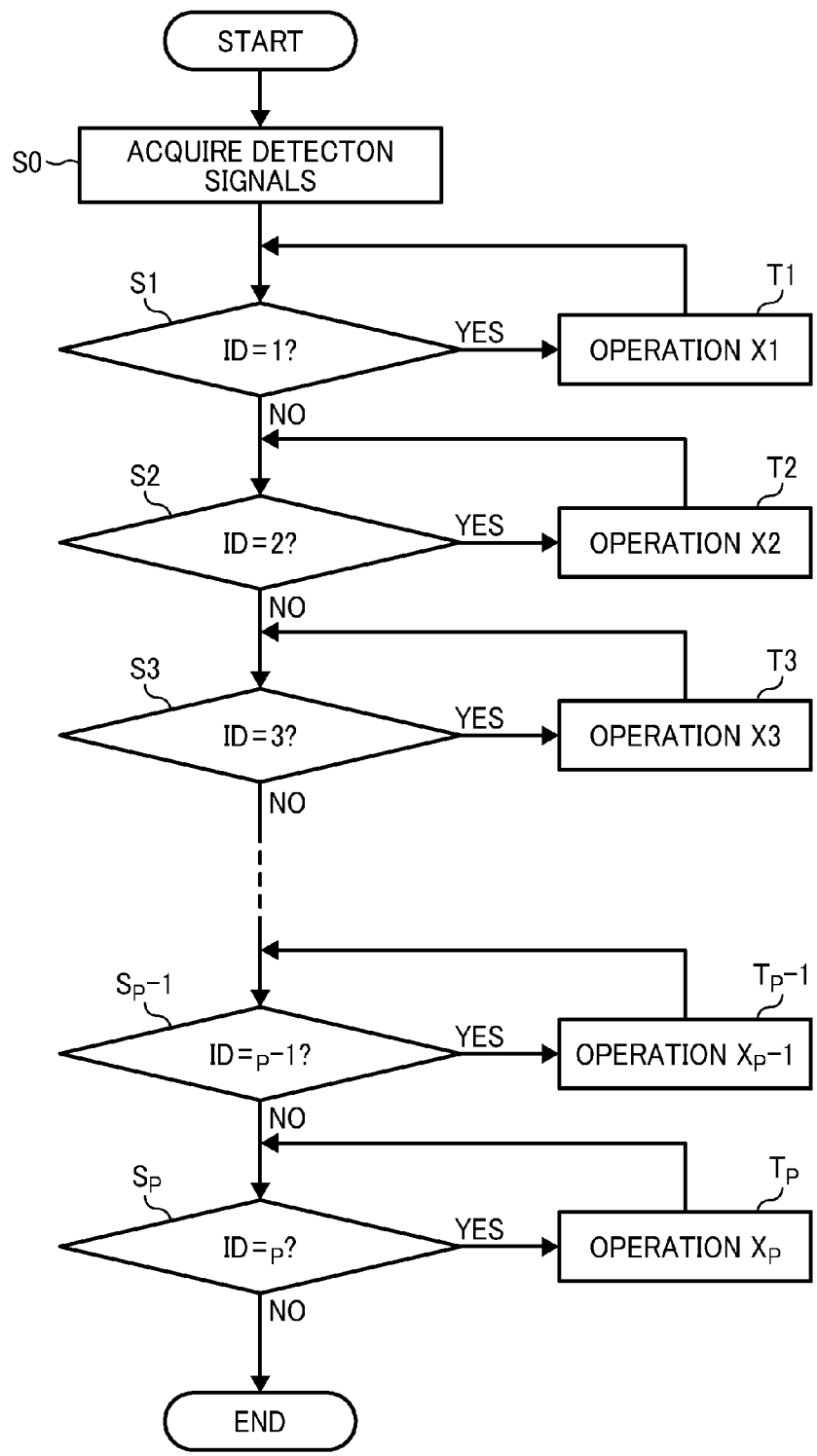
FIG. 4 is a flowchart illustrating an operation of the operator guidance system according to one or more embodiments of this patent specification.

FIG. 4 is a flowchart illustrating an operation of the operator guidance system 100 according to one or more embodiments of this patent specification.

As shown in FIG. 4, upon occurrence a paper jam in the sheet conveyance path P, the controller 33 initially acquires specific values of the detection signals output from the sheet sensors A, the opening sensors B, and the jam detectors J (step S0). The detection signals may be sampled at a suitable interval of, for example, 500 milliseconds, for preventing adverse effects from chattering or other noise on the sensor or detector signals.

With the detection signals thus obtained, the controller 33 accesses the memory 32 to compare the detected combination of signal values with that identified by the ID number "1" in the reference table (step S1).

Where the detected combination matches the combination numbered "1" ("YES" in step S1), the controller 33 selects a manual operation defined in the operation field of the corresponding row in the reference table, and indicates the selected operation to the operator (step T1).

Where the detected combination does not match the combination numbered "1" ("NO" in step S1), the system 100 then compares the detected combination of detection signal values with that identified by the ID number "2" in the reference table (step S2), and repeats the similar procedure with respect to all the subsequent ID numbers.

With additional reference to Table 1, consider a situation in which a recording sheet S is jammed around the registration roller pair 55 during operation, causing the jam detector J1 to output "1" indicating occurrence of a paper jam, the opening sensors B1 and B2 to output "0" indicating closure of the duplex door Q1 and the secondary transfer guide plate Q2, respectively, and the sheet sensor A6 to output "1" indicating presence of the recording sheet S adjacent to the registration roller pair 55.

In that case, the detected combination of signal values matches the combination numbered "k+1" in the reference table. Accordingly, the system 100 determines that the subsequently required operation is to open the duplex door Q1, as defined in the operation field Xk+1 in the reference table, and indicates it to the operator, for example, through display on the control panel. As the operator opens the duplex door Q1 following the indication, the opening sensor B1 changes its output from "0" to "1", resulting in the operational status ID updated from "k+1" to "k+2".

Then, since the detected combination matches the combination numbered "k+2", the system 100 determines that the subsequently required operation is to open the secondary transfer guide plate Q2, as defined in the operation field Xk+2 in the reference table, and indicates it to the operator, for example, through display on the control panel. As the operator opens the secondary transfer guide plate Q2 following the indication, the opening sensor B2 changes its output from "0" to "1", resulting in the operational status ID updated from "k+2" to "k+3".

Then, since the detected combination matches the combination numbered "k+3", the system 100 determines that the subsequently required operation is to remove the recording sheet S, as defined in the operation field Xk+3 in the reference table, and indicates it to the operator, for example, through display on the control panel. As the operator removes the recording sheet S following the indication, the sheet sensor A6 changes its output from "1" to "0", resulting in the operational status ID updated from "k+3" to "k+4".

Then, since the detected combination matches the combination numbered "k+4", the system 100 determines that the subsequently required operation is to close the secondary transfer guide plate Q2, as defined in the operation field Xk+4 in the reference table, and indicates it to the operator, for example, through display on the control panel. As the operator closes the secondary transfer guide plate Q2 following the indication, the opening sensor B2 changes its output from "1" to "0", resulting in the operational status ID updated from "k+4" to "k+5".

Then, since the detected combination matches the combination numbered "k+5", the system 100 determines that the subsequently required operation is to close the secondary transfer guide plate Q2, as defined in the operation field Xk+5 in the reference table, and indicates it to the operator, for example, through display on the control panel. As the operator has already closed the secondary transfer guide plate Q2 at this time, the jam detector J1 immediately changes its output from "1" to "0", resulting in the operational status ID updated from "k+5" to "k+6".

Note that the second- and third-to-last of the grouped range of ID numbers "k+1" through "k+6" are both associated with closure of the secondary transfer guide plate Q2. Such duplicated appearance of the identical operation in the consecutive rows allows for updating the jam detector field subsequent to updating the opening sensor field, which in turn allows for proper identification of the operational status by the ID numbers. Transition of the status ID from "k+5" to "k+6" takes place in an extremely short period of time, which is dependent on the processing speed and other variables of the controller analyzing the reference table, but is substantially imperceptible to the human operator to whom the indication is presented.

With continued reference to FIG. 4, where the detected combination does not match the combination numbered "p−1" ("NO" in step Sp−1), the controller 33 then compares the detected combination of detection signal values with that identified by the last ID number "p" in the reference table (step Sp).

Where the detected combination does not match the combination numbered "p" ("NO" in step Sp), the controller 33 then determines that the combination of detection signal values is restored to the original, default status in which all the jam detectors J output "0" indicating no paper jam exists in the sheet conveyance path P, all the opening sensors B output "0" indicating closure of all the openable structure, and all the sheet sensors A output "0" indicating absence of a recording sheet S in the sheet conveyance path P, upon which the operation of the operator guidance system 100 terminates.

Although in the present embodiment, the controller 33 initially compares the detected combination of signal values with that numbered "1" in the reference table, followed by those numbered "2", "3", "4", and so on in numerical order, alternatively, comparison between the detected and stored combinations of detection signal values may be performed otherwise than specifically described herein.

For example, where the detected combination once matches the combination identified by a specific ID number other than "1", the controller 33 may perform subsequent comparison of detection signal values starting from the signal combination assigned this particular ID number. Such arrangement allows for quick, time-efficient identification of the operational status based on the reference table by the controller 33.

FIGS. 5A through 5E are schematic views of exemplary screens displayed on the control panel by the operator guidance system 100 according to one embodiment of this patent specification.

As shown in FIGS. 5A through 5E, upon occurrence of a malfunction, the system 100 displays an instruction screen that contains an alert message with a map on the left side, indicating one or more locations of existing paper jams, and an animated illustration on the right side, indicating a procedure to be performed to clear each paper jam location.

Figure 5A:
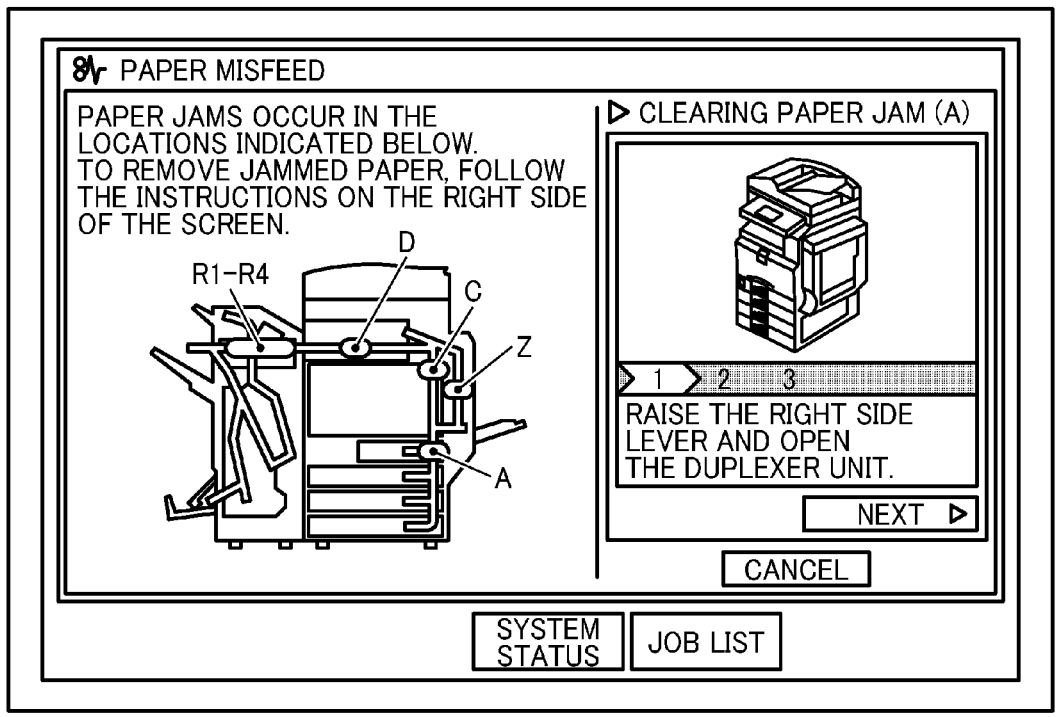
FIGS. 5A through 5E are schematic views of exemplary screens displayed by the operation indicator included in the operator guidance system.
Figure 5B:
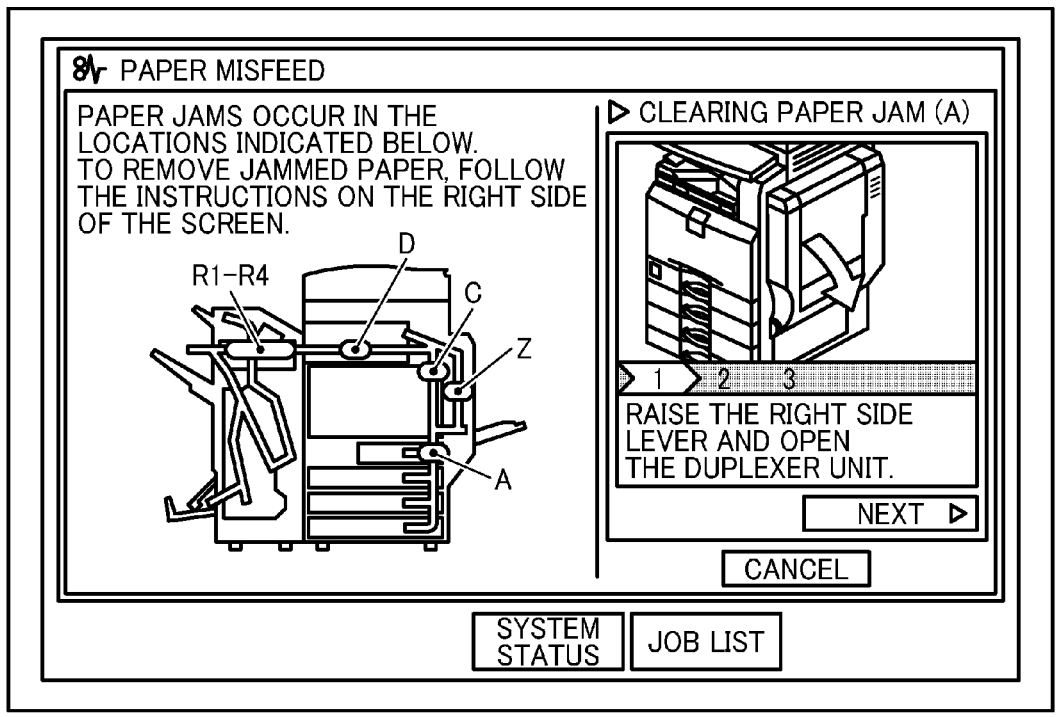
Figure 5C:
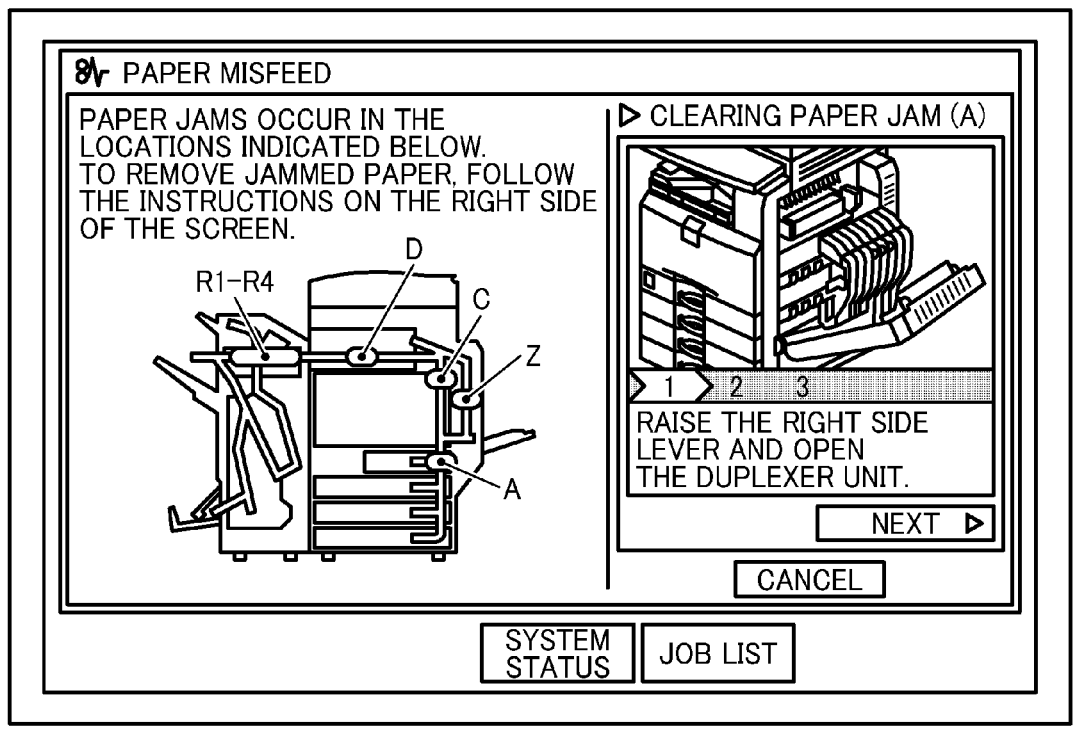
Figure 5D:
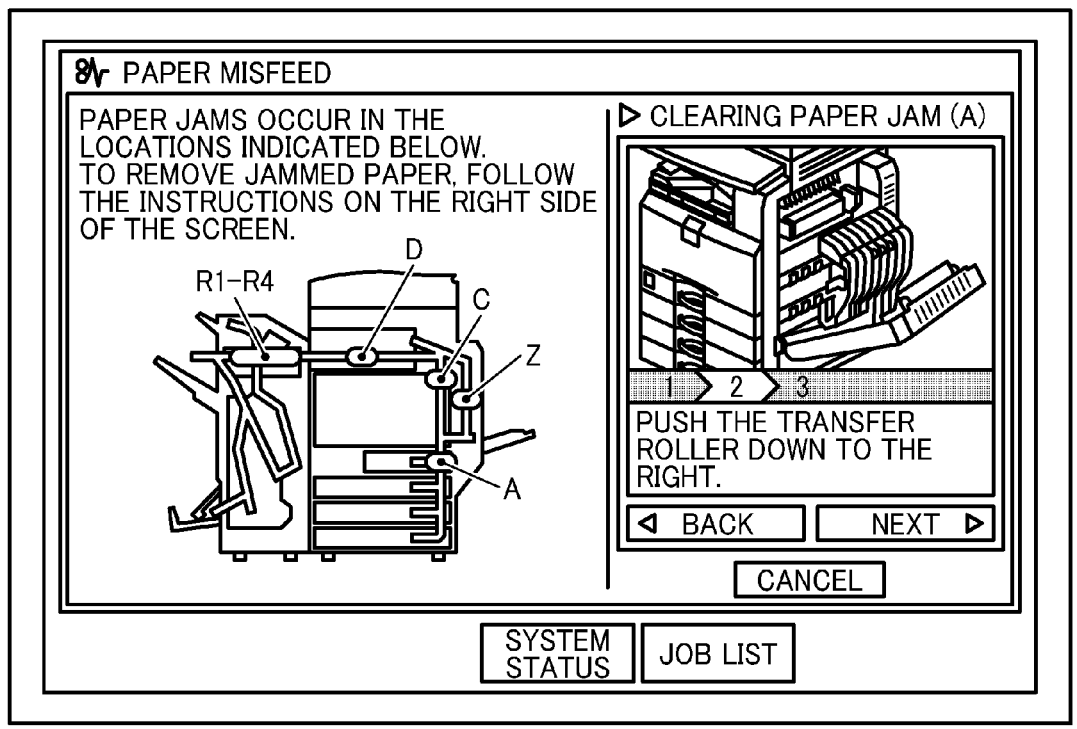
Figure 5E:
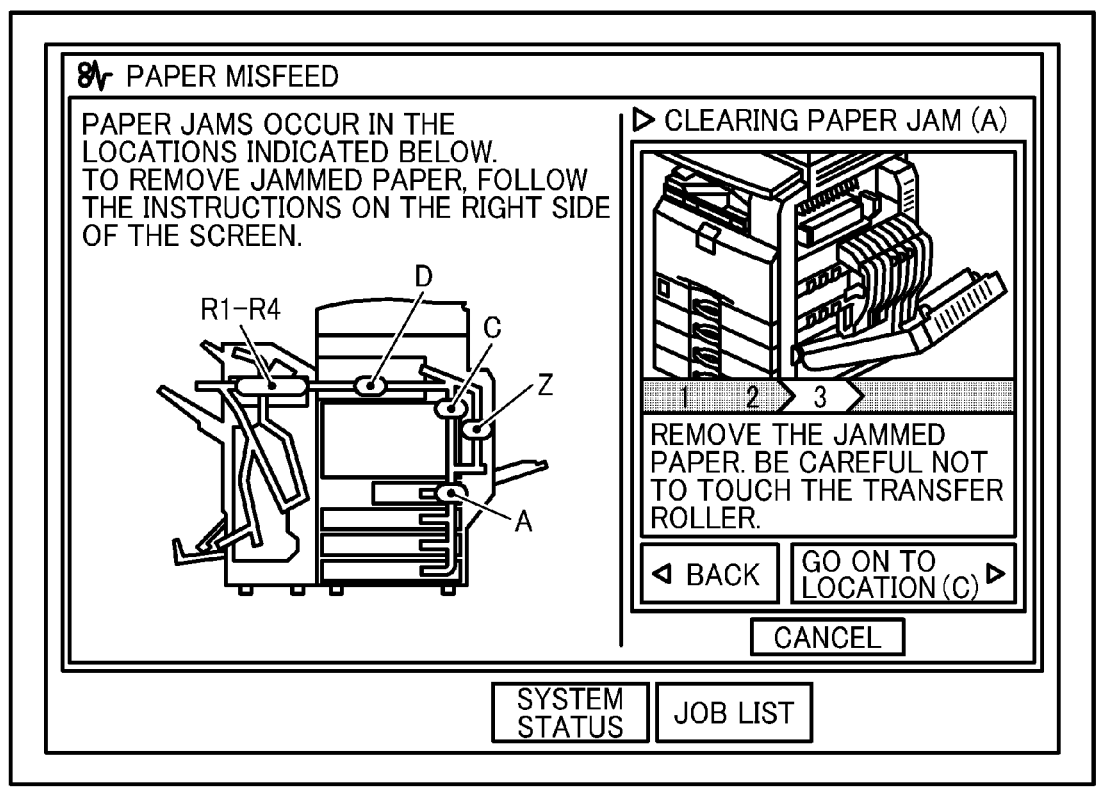

In the present case, the system 100 initially provides instructions for clearing a paper jam at the duplex path Pb, displaying an animated, automatically repeating sequence of images on the right side, which illustrates the manner in which the duplex door can be opened (FIGS. 5A through 5C). Instead of displaying an animation or image sequence, alternatively, the manual operation may be illustrated using a single still image on the instruction screen.

Where the operator opens the duplex door following the instruction, the system 100 then automatically switches the instruction screen to a subsequent one, which illustrates the manner in which the secondary transfer guide plate can be opened (FIG. 5D).

Where the operator opens the secondary transfer guide plate following the instruction, the system 100 then automatically switches the instruction screen to a subsequent one, which illustrates the manner in which the jammed recording sheet can be removed (FIG. 5E).

Where the operator removes the jammed recording sheet following the instruction, the system 100 then automatically switches the instruction screen to a subsequent one, which provides instructions for clearing a paper jam at a different location than the duplex path Pb.

Thus, the operator guidance system 100 according to this patent specification enables the operator to perform a manual operation on the image forming apparatus 1 quickly and effortlessly, owing to the control unit 31 determining the operational status and its associated manual operation to be performed based on a combination of detection signals output from the detection unit 30, which represents time-varying, realtime information of the operational status that varies as the operator manipulates the openable structure or removes the paper jam from the apparatus.

Advantageously, the operator guidance system 100 can switch the operation indication automatically in response to execution of each manual operation, without requiring the operator to perform any extra action, such as pressing a "next" button on the screen, which can be confusing or annoying to the operator performing complicated manual operations on the equipment. Such reactive, automatic switching capability of the operation indicator is effective particularly where the operator, having executed several successive operations without viewing the display screen, seeks to know a subsequently required operation from the control panel, leading to increased operability compared to a configuration in which the operator is required to hit the "next" button several times to reach the corresponding display screen, which makes it inconvenient or difficult for the operator to follow the guidance information on the display screen.

As mentioned earlier, in several embodiments of the operator guidance system 100, the controller 33 identifies one or more manual operations to be performed consecutively upon occurrence of a malfunction, each operation numbered with a unique identifier number, in which case the operation indicator 34 indicates initially a lower-numbered operation and subsequently a higher-numbered operation after the operator executes the lower-numbered operation.

In further embodiment, the operation indicator 34 may omit indicating the higher-numbered operation in a condition in which the operator executes the higher-numbered operation prior to the lower-numbered operation. Moreover, the control unit 31 may assume that the operator completes a series of manual operations, including opening of the openable structure Q, removal of the recording sheet S, and closure of the openable structure Q, in a condition in which the detection unit 30 detects that the operator removes the recording sheet S without opening or closing the openable structure Q.

Specifically, in the present embodiment, the control unit 31 determines recovery from a paper jam where the detection signal output from the sheet sensor A indicates absence of the recording sheet S in the sheet conveyance path S, even where the detection signal output from the opening sensor B does not indicate opening or closing of the openable structure Q.

Table 2 below shows another exemplary excerpt from the reference table included in the memory 32.

TABLE 2

| ID | Opening sensor | | | | | Sheet sensor | | | | | | Jam detector | | | | Manual operation |
|---|---|---|---|---|---|---|---|---|---|---|---|---|---|---|---|---|
| | B1 | B2 | B3 | ... | Bn | A1 | ... | A5 | A6 | A7 | A8 | ... | Am | ... | J4 | ... | J1 | |
| 0 | 0 | 0 | 0 | ... | 0 | 0 | ... | 0 | 0 | 0 | 0 | ... | 0 | ... | 0 | ... | 0 | (Default) |
| 1 | | | | | | | | | | | | | | | | | | X1 |
| 2 | | | | | | | | | | | | | | | | | | X2 |
| ... | | | | | | | | | | | | | | | | | | ... |
| o + 1 | 0 | — | — | | — | 1 | | — | — | — | — | | — | | 1 | | — | Xo + 1: Open the duplex door |
| o + 2 | 1 | — | — | | — | 1 | | — | — | — | — | | — | | 1 | | — | Xo + 2: Remove the recording sheet |
| o + 3 | 1 | — | — | | — | 0 | | — | — | — | — | | — | | 1 | | — | Xo + 3: Remove the recording sheet |

TABLE 2-continued

| ID | Opening sensor | | | | | Sheet sensor | | | | | | Jam detector | | | | Manual operation |
| --- | --- | --- | --- | --- | --- | --- | --- | --- | --- | --- | --- | --- | --- | --- | --- | --- |
| | B1 | B2 | B3 | ... | Bn | A1 | ... | A5 | A6 | A7 | A8 | ... Am | ... | J4 | ... J1 | |
| o + 4 | 1 | — | — | — | — | 0 | — | — | — | — | — | — | | 0 | — | Xo + 4: Close the duplex door |
| o + 5 | 0 | — | — | — | — | 0 | — | — | — | — | — | — | | 1 | — | Xo + 5: Close the duplex door |
| o + 6 | 0 | — | — | — | — | 0 | — | — | — | — | — | — | | 0 | — | Xo + 6: Continue to the next step |
| ... | | | | | | | | | | | | | | | | ... |
| p − 1 | | | | | | | | | | | | | | | | Xp − 1 |
| p | | | | | | | | | | | | | | | | Xp |
| END | 0 | 0 | 0 | ... | 0 | 0 | ... | 0 | 0 | 0 | 0 | ... 0 | ... | 0 | ... 0 | (Default) |

With reference to Table 2, consider a situation in which a recording sheet S is jammed around the sheet diverter 63 at the entry into the duplex unit 6 during operation, causing the jam detector J4 to output "1" indicating occurrence of a paper jam, the opening sensor B1 to output "0" indicating closure of the duplex door Q1, and the sheet sensor A1 to output "1" indicating presence of the recording sheet S adjacent to the sheet diverter 63.

In that case, the detected combination of signal values matches the combination numbered "o+1" in the reference table. Accordingly, the system 100 determines that the subsequently required series of operations is to open the duplex door Q1, as defined in the operation field Xo+1 in the reference table, and indicates it to the operator, for example, through display on the control panel.

In the present embodiment, unlike the foregoing embodiment, the paper jam takes place at the entry of the duplex unit 6 where the jammed recording sheet S is accessible from outside through the output opening leading to the in-body output sheet tray 41. Such positioning of the paper jam results in ignorance or disobedience of the indicated manual operation by the operator, who, noticing the exposed portion of the jammed sheet, directly pulls it out through the output opening without manipulating the duplex door Q1.

Where the operator removes the recording sheet S without opening the duplex door Q1, the sheet sensor A1 changes its output from "1" to "0", resulting in the operational status ID updated from "o+1" to "o+5", skipping the intervening numbers "o+2" through "o+4".

Then, since the detected combination matches the combination numbered "o+5", the system 100 determines that the subsequently required operation is to close the duplex door Q1, as defined in the operation field Xo+5 in the reference table, and indicates it to the operator, for example, through display on the control panel. As the duplex door Q1 has been closed at this time, the jam detector J1 immediately changes its output from "1" to "0", resulting in the operational status ID updated from "o+5" to "o+6".

Note that, as is the case with the foregoing embodiment, the second- and third-to-last of the grouped range of ID numbers "o+1" through "o+6" are both associated with closure of the duplex door Q1. Such duplicated appearance of the identical operation in the consecutive rows allows for updating the jam detector field subsequent to updating the opening sensor field, which in turn allows for proper identification of the operational status by the ID numbers. Transition of the status ID from "o+5" to "o+6" takes place in an extremely short period of time, which is dependent on the processing speed and other variables of the controller analyzing the reference table, but is substantially imperceptible to the human operator to whom the indication is presented.

In the present case, after removal of the recording sheet S from the duplex unit 6 (which is the only location where the paper jam has been detected), the combination of detection signal values is restored to the original, default status in which all the jam detectors J output "0" indicating no paper jam exists in the sheet conveyance path P, all the opening sensors B output "0" indicating closure of all the openable structure Q, and all the sheet sensors A output "0" indicating absence of a recording sheet S in the sheet conveyance path P, upon which the operation of the operator guidance system 100 terminates.

In such a configuration, the system 100 allows the operator to properly carry out removal of the paper jam while omitting several of the series of manual operations stored in the reference table, insofar as the paper jam takes place at a single location accessible to the operator without manipulating the openable structure (e.g., at those portions of the output unit that can be accessed with out opening the duplex door Q1, the secondary transfer guide plate Q2, and the duplex guide plate Q3), and insofar as there is at least one sheet sensor that can detect presence or absence of the recording sheet S at that location of the paper jam (e.g., the sheet sensor A2 directed to the output unit).

Thus, the operator guidance system 100 according to this patent specification enables the operator to perform a manual operation on the image forming apparatus 1 quickly and effortlessly. In particular, as exemplified by the embodiment described above, the system 100 allows for quick, effortless manipulation by the operator even where the operator removes a paper jam while ignoring several of a series of manual operations presented by the operation indicator, and can provide the operator with guidance information in a timely manner without requiring the operator to perform an unnecessary manual operation, such as closing an access door, for triggering the display device to inform the operator of completion or incompletion of the paper jam removal.

As mentioned earlier, in several embodiments of the operator guidance system 100, the controller 33 identifies one or more series of operations to be performed consecutively upon occurrence of a malfunction, each operation numbered with a unique identifier number, in which case the operation indicator 34 indicates initially a lower-numbered series of operations and subsequently a higher-numbered series of operations after the operator executes the lower-numbered series of operations.

In still further embodiment, the operation indicator 34 may omit indicating the higher-numbered series of operations in a condition in which the operator executes the higher-numbered series of operations prior to the lower-numbered series of operations.

Specifically, in the present embodiment, upon occurrence of multiple paper jams for each of which the controller identifies a series of manual operations for indication to the operator, the operation indicator 34 does not indicate a series of operations for removing one paper jam that has been removed by the operator during indication of a series of operations for removing another paper jam.

With reference to Table 1, consider a situation in which two recording sheets S are jammed during operation, one around the registration roller pair 55 and the other within the duplex guide plate Q3, causing the jam detectors J1 and J2 to output "1" indicating occurrence of paper jams, the opening sensors B1, B2, and B3 to output "0" indicating closure of the duplex door Q1, the secondary transfer guide plate Q2, and the duplex guide plate Q3, respectively, and the sheet sensors A5 and A6 to output "1" indicating presence of the recording sheet S adjacent to the duplex guide plate Q3 and the registration roller pair 55, respectively.

In that case, the detected combination of signal values initially matches the combination numbered "k+1" in the reference table. Accordingly, the system 100 determines that the subsequently required operation is to open the duplex door Q1, as defined in the operation field Xk+1 in the reference table, and indicates it to the operator, for example, through display on the control panel. As the operator opens the duplex door Q1 following the indication, the opening sensor B1 changes its output from "0" to "1", resulting in the operational status ID updated from "k+1" to "k+2".

Then, since the detected combination matches the combination numbered "k+2", the system 100 determines that the subsequently required operation is to open the secondary transfer guide plate Q2, as defined in the operation field Xk+2 in the reference table, and indicates it to the operator, for example, through display on the control panel.

Where the operator, ignoring or disobeying the indicated manual operation, subsequently opens the duplex guide plate Q3 instead of opening the secondary transfer guide plate Q2, the opening sensor B3 changes its output from "1" to "0". Then, where the operator removes the recording sheet S, and subsequently closes the duplex guide plate Q3, the sheet sensor A5, the opening sensor B3, and the jam detector J2 respectively change their outputs from "1" to "0".

At that time, opening of the duplex guide plate Q3, followed by removal of the recording sheet S and subsequent closure of the duplex guide plate Q3, does not result in updating the operational status ID and concomitant switching of the operation indicator 34, since the outputs of the opening sensor B3, the sheet sensor A5, and the jam detector J2 are masked or excluded from reference by the controller 33 during indication of the manual operation Xk+2 directed to the paper jam adjacent to the registration roller pair 55. As a result, the series of operations Xk+7 through Xk+12 are not indicated either during or after indication of the series of operations Xk+1 through Xk+6.

Thereafter, where the operator performs all the subsequent manual operations Xk+2 through Xk+5 indicated by the operation indicator 34, the combination of detection signal values is restored to the original, default status in which all the jam detectors J output "0" indicating no paper jam exists in the sheet conveyance path P, all the opening sensors B output "0" indicating closure of all the openable structure, and all the sheet sensors A output "0" indicating absence of a recording sheet S in the sheet conveyance path P, upon which the operation of the operator guidance system 100 terminates.

Figure 6A:
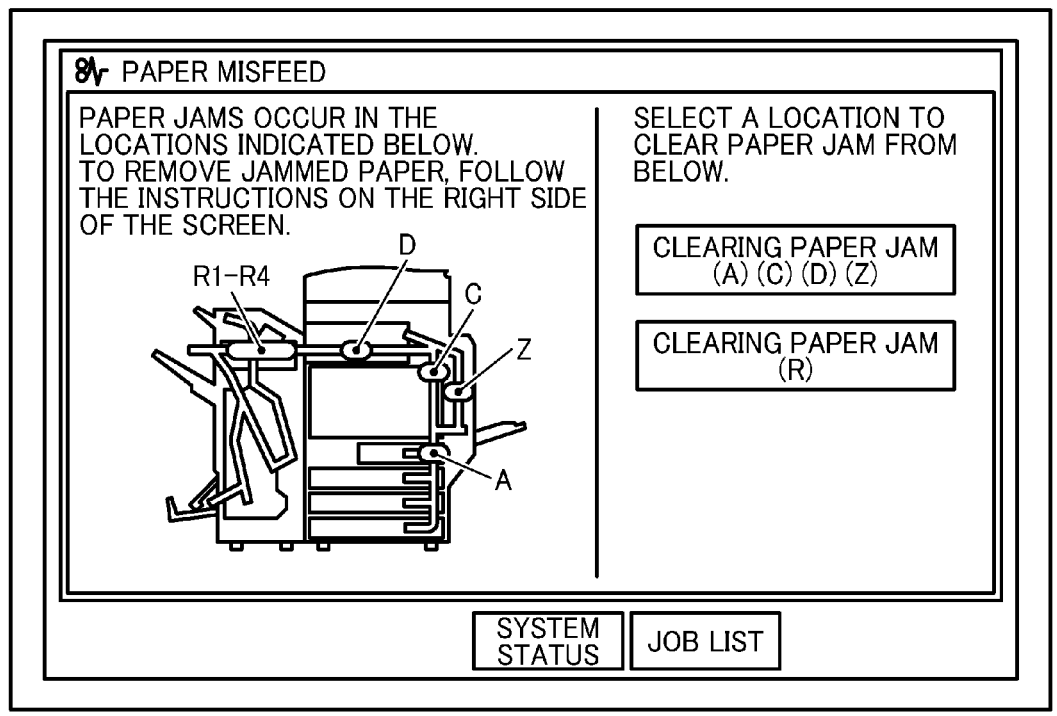
FIGS. 6A and 6B are schematic views of exemplary screens displayed by the operation indicator included in the operator guidance system.
Figure 6B:
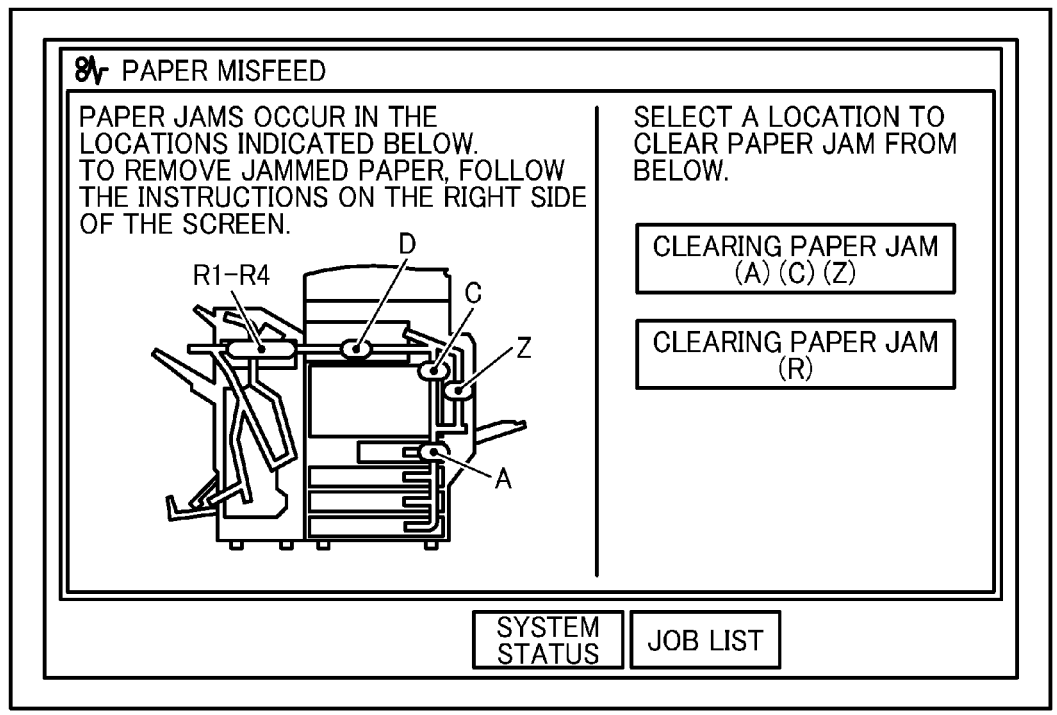

FIGS. 6A and 6B are schematic views of exemplary screens displayed on the control panel by the operator guidance system 100 according to one embodiment of this patent specification.

As shown in FIGS. 6A and 6B, upon occurrence of a malfunction, the system 100 displays an instruction screen that contains an alert message with a map on the left side, indicating one or more locations of existing paper jams, and a selection prompt on the right side, requesting the operator to select a specific paper jam location to be cleared.

Figure 7:
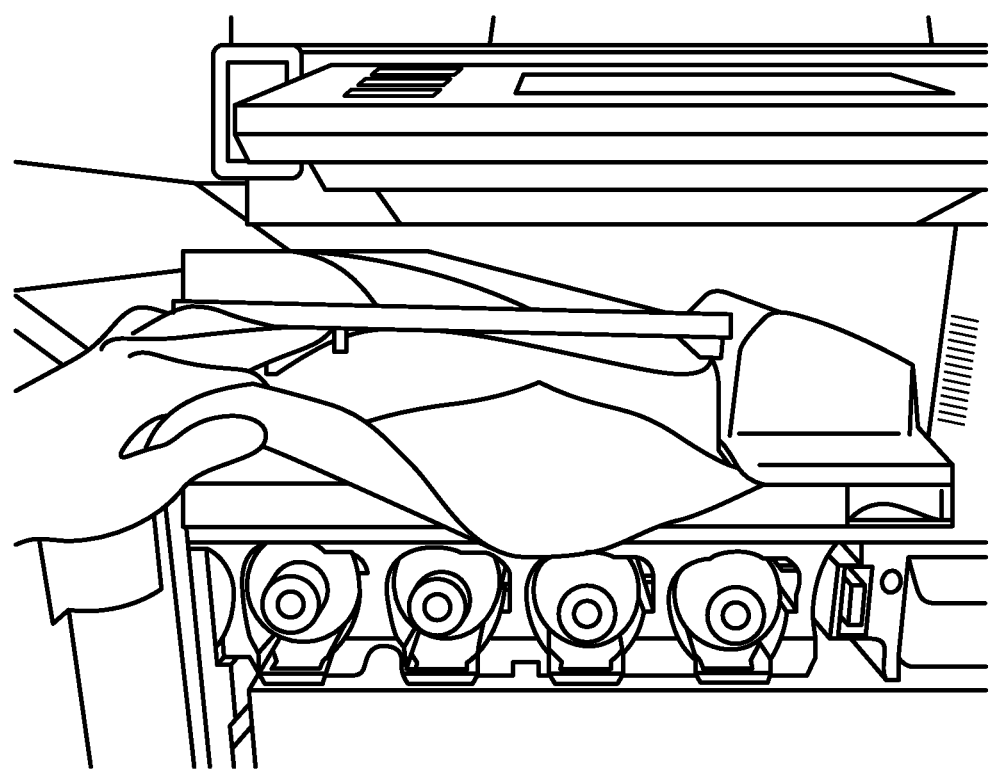
FIG. 7 is a schematic view of a situation in which an operator removes a jammed recording sheet from the apparatus.

In the present case, the system 100 initially indicates that the paper jams exist at five locations labeled "A", "C", "D", "Z", and "R", respectively, prompting the operator to select one from those paper jam locations (FIG. 6A).

Where the operator removes the jammed sheet from one of the indicated locations of paper jams as shown in FIG. 7, while ignoring or disobeying the indication presented on the control panel, the system 100 updates the instruction screen to display the locations of existing paper jams, which no longer include the location labeled "D" that has been cleared by the operator (FIG. 6B). In addition to excluding the cleared paper jam from display on the instruction screen, the system 100 may display a prompt that requests the operator to close the openable structure that no longer needs to be opened after clearance of the paper jam.

Thus, the operator guidance system 100 according to this patent specification enables the operator to perform a manual operation on the image forming apparatus 1 quickly and effortlessly. In particular, as exemplified by the embodiment described above, the system 100 allows for quick, effortless manipulation by the operator even where the operator removes a paper jam while ignoring the indicated order in which multiple paper jams are removed, or other indication or prompt presented by the operation indicator, and can provide the operator with guidance information in a timely manner without confusing the operator by presenting unnecessary or possibly misleading indication, such as indicating the location or presence of a paper jam that has already been cleared.

Hence, the operator guidance system 100 according to this patent specification can effectively provide guidance to a human operator using an image forming apparatus 1 that includes a media conveyance path P along which a recording medium S is conveyed, and an openable structure Q manually operable by the operator to allow access to the media conveyance path P when opened.

The operator guidance system 100 includes a detection unit 30 disposed in the image forming apparatus 1 to output a combination of detection signals, a control unit 31 connected to the detection unit 30 to determine guidance to be provided to the operator based on the combination of detection signals, and an operation indicator 34 connected to the control unit 31 to indicate the identified operation to the operator.

The detection unit 30 includes one or more media sensors A disposed along the media conveyance path P to output a media detection signal indicating presence or absence of the recording medium S in the media conveyance path P, and one or more opening sensors B disposed adjacent to the openable structure Q to output an opening detection signal indicating opening or closing of the openable structure Q. The control unit 31 includes a memory 32 storing a reference table that associates combinations of detection signals with manual operations that the operator performs on the apparatus 1, and a controller 33 to identify a particular manual operation associated with the combination of detection signals output from the detection unit 30 in the reference table.

The system 100 may be applied to any type of apparatus that includes a media conveyance path P along which a recording medium is conveyed, and an openable structure Q manually operable by the operator to allow access to the media conveyance path P when opened. Examples of such apparatuses include, but are not limited to, an electrophotographic image forming apparatus, such as a photocopier, a laser printer, a facsimile, or the like.

Numerous additional modifications and variations are possible in light of the above teachings. It is therefore to be understood that, within the scope of the appended claims, the disclosure of this patent specification may be practiced otherwise than as specifically described herein.

What is claimed is:

1. An operator guidance system to provide guidance to a human operator using an image forming apparatus, the image forming apparatus including a media conveyance path along which a recording medium is conveyed, and an openable structure manually operable by the operator to allow access to the media conveyance path when opened, the operator guidance system comprising:
   a detection unit disposed in the image forming apparatus to output a combination of detection signals, the combination of detection signals including at least a media detection signal and an opening detection signal, the detection unit including:
   one or more media sensors disposed along the media conveyance path to output the media detection signal, the media detection signal indicating presence or absence of the recording medium in the media conveyance path, and
   one or more opening sensors disposed adjacent to the openable structure to output the opening detection signal, the opening detection signal indicating opening or closing of the openable structure;
   a control unit connected to the detection unit to determine guidance to be provided to the operator based on the combination of detection signals, the control unit including:
   a memory storing a reference table that associates combinations of detection signals with manual operations which the operator performs on the apparatus such that the reference table associates the media detection signal and opening detection signal with a series of the manual operations to complete to reset the media detection signal and opening detection signal, and
   a controller to identify a particular manual operation associated with the combination of detection signals output from the detection unit in the reference table; and
   an operation indicator connected to the control unit to indicate the identified operation to the operator.

2. The system according to claim 1, wherein the controller identifies one or more manual operations to be performed consecutively upon occurrence of a malfunction, each operation numbered with a unique identifier number,
   the operation indicator indicates initially a lower-numbered operation and subsequently a higher-numbered operation after the operator executes the lower-numbered operation.

3. The system according to claim 2, wherein the operation indicator omits indicating the higher-numbered operation in a condition in which the operator executes the higher-numbered operation prior to the lower-numbered operation.

4. The system according to claim 1, wherein the control unit assumes that the operator completes a series of manual operations, including opening of the openable structure, removal of the recording medium, and closure of the openable structure, in a condition in which the detection unit detects that the operator removes the recording medium without opening or closing the openable structure.

5. The system according to claim 1, wherein the controller identifies one or more series of operations to be performed consecutively upon occurrence of a malfunction, each operation numbered with a unique identifier number,
   the operation indicator indicates initially a lower-numbered series of operations and subsequently a higher-numbered series of operations after the operator executes the lower-numbered series of operations.

6. The system according to claim 5, wherein the operation indicator omits indicating the higher-numbered series of operations in a condition in which the operator executes the higher-numbered series of operations prior to the lower-numbered series of operations.

7. The system according to claim 1, wherein
   the combination of media detection signals further includes a jam detection signal indicating a position of a jammed recording medium, the position being calculated by a conveyance control circuit based on the media detection signal, and
   the detection unit further includes a jam detector configured to output the jam detection signal.

8. The system of claim 7, wherein the conveyance control circuit is configured to calculate the position of the jammed recording medium based on a size of the recording medium.

9. The system according to claim 1, wherein the operation indicator presents information in a form selected from the group consisting of sound, text, graphic, animation, video, and combinations thereof.

10. The system according to claim 1, wherein the operation indicator includes a display device that visually indicates the identified operation.

11. The system according to claim 1, wherein the operation indicator includes an audio device that audibly indicates the identified operation.

12. An operator guidance method for providing guidance to a human operator using an apparatus that includes a media conveyance path along which a recording medium is conveyed, and an openable structure to allow access to the media conveyance path when opened, the method comprising:
   generating a combination of detection signals including,
      a media detection signal indicative of presence or absence of the recording medium in the media conveyance path, and
      an opening detection signal indicative of opening or closing of the openable structure;
   identifying a particular manual operation associated with the generated combination of detection signals in a reference table that associates combinations of detection signals with manual operations which the operator performs on the apparatus such that the reference table associates the media detection signal and opening detection signal with a series of the manual operations to complete to reset the media detection signal and opening detection signal; and
   indicating the identified operation to the operator.

13. The method of claim 12, wherein
   the generating the combination of detection signals further includes generating a jam detection signal the combination of media detection signals further includes a jam detection signal, the jam detection signal indicating a position of a jammed recording medium, the position being calculated by a conveyance control circuit based on the media detection signal.

14. The method of claim 8, wherein the conveyance control circuit is configured to calculate the position of the jammed recording medium based on a size of the recording medium.

15. An image forming apparatus, comprising:
- a media conveyance path along which a recording medium is conveyed;
- an openable structure to allow access to the media conveyance path when opened;
- sensors configured to generate a combination of detection signals including,
  - a media detection signal indicative of presence or absence of the recording medium in the media conveyance path, and
  - an opening detection signal indicative of opening or closing of the openable structure;
- a control unit to identify a particular manual operation to be subsequently performed on the apparatus based on the generated combination of detection signals by accessing a reference table that associates combinations of detection signals with manual operations which an operator performs on the apparatus such that the reference table associates the media detection signal and opening detection signal with a series of the manual operations to complete to reset the media detection signal and opening detection signal; and
- an operation indicator connected to the control unit to indicate the identified operation.

16. The apparatus of claim 15, wherein
- the combination of media detection signals further includes a jam detection signal indicating a position of a jammed recording medium, the position being calculated by a conveyance control circuit based on the media detection signal, and
- the sensors further includes a jam detector configured to output the jam detection signal.

17. The apparatus of claim 14, wherein the conveyance control circuit is configured to calculate the position of the jammed recording medium based on a size of the recording medium.

* * * * *